US011339971B2

(12) United States Patent
Liu et al.

(10) Patent No.: US 11,339,971 B2
(45) Date of Patent: May 24, 2022

(54) OVEN WITH AUTOMATIC CONTROL OF PAN ELEVATION

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Qiang Liu, Cupertino, CA (US); Xin Yan, San Jose, CA (US)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 115 days.

(21) Appl. No.: 16/570,987

(22) Filed: Sep. 13, 2019

(65) Prior Publication Data
US 2021/0080114 A1    Mar. 18, 2021

(51) Int. Cl.
*A23L 5/10* (2016.01)
*F24C 7/08* (2006.01)
(Continued)

(52) U.S. Cl.
CPC ................ *F24C 7/081* (2013.01); *A23L 5/15* (2016.08); *A47J 36/32* (2013.01); *F24C 7/043* (2013.01);
(Continued)

(58) Field of Classification Search
CPC .......... F24C 7/081; F24C 7/043; F24C 15/16; A23L 5/15; A47J 36/32; A47J 37/0629; A47J 36/321; A23V 2002/00
(Continued)

(56) References Cited

U.S. PATENT DOCUMENTS 1,113,487 A * 10/1914 Rose .......................... F24C 7/06
219/394
5,429,043 A * 7/1995 Becker .................... F24C 15/16
126/337 A
(Continued)

FOREIGN PATENT DOCUMENTS

CN    101634592 A  *  1/2010
CN    106419498 A  *  2/2017
(Continued)

OTHER PUBLICATIONS

Sara Moulton, "Kitchen Shrink: How do you decide which level of the oven to use?" Jul. 8, 2017 https://saramoulton.com/2017/07/kitchen-shrink-how-do-you-decide-which-oven-rack-to-use/ (Year: 2017).*

*Primary Examiner* — Drew E Becker
*Assistant Examiner* — Austin Parker Taylor
(74) *Attorney, Agent, or Firm* — Morgan, Lewis & Bockius LLP

(57) ABSTRACT

System and method for controlling a smart cooking appliance, including: at an oven comprising a cooking chamber, a food support platform, and a control unit; detecting a first event corresponding to a start of a cooking process for a food item, wherein a first heating surface of the cooking chamber is operating at a first preset output level; in response to detecting the first event, activating one or more actuators to move the food support platform to a first position; while the food support platform is at the first position and while the first heating surface is operating at the first preset output level, detecting that oven reconfiguration criteria are met; and in response to detecting that the oven reconfiguration criteria are met, activating the one or more actuators to move the food support platform from the first position to a second position that is distinct from the first position.

12 Claims, 10 Drawing Sheets

(51) Int. Cl.
*A47J 36/32* (2006.01)
*F24C 7/04* (2021.01)
*F24C 15/16* (2006.01)
*A47J 37/06* (2006.01)

(52) U.S. Cl.
CPC .......... *F24C 15/16* (2013.01); *A23V 2002/00* (2013.01); *A47J 37/0629* (2013.01)

(58) Field of Classification Search
USPC .......................................................... 426/233
See application file for complete search history.

(56) References Cited

U.S. PATENT DOCUMENTS

| | | | | |
|---|---|---|---|---|
| 5,736,716 | A * | 4/1998 | Kim | H05B 6/6411 |
| | | | | 219/708 |
| 7,856,971 | B2 * | 12/2010 | Amaral | A47J 37/0704 |
| | | | | 126/25 A |
| 9,097,429 | B2 * | 8/2015 | Nam | F24C 15/16 |
| 9,109,804 | B2 * | 8/2015 | Armstrong | A47B 57/10 |
| 2006/0016801 | A1 * | 1/2006 | Kitabayashi | F24C 15/325 |
| | | | | 219/497 |
| 2008/0309211 | A1 * | 12/2008 | Wilson | F24C 15/02 |
| | | | | 312/410 |
| 2010/0192784 | A1 * | 8/2010 | Shim | F24C 7/082 |
| | | | | 99/325 |
| 2016/0174748 | A1 * | 6/2016 | Baldwin | A47J 36/321 |
| | | | | 99/330 |
| 2017/0224160 | A1 * | 8/2017 | Casey | H05B 6/6414 |
| 2017/0257914 | A1 * | 9/2017 | Nikishov | H05B 6/725 |
| 2019/0150205 | A1 * | 5/2019 | Huang | H04L 12/2825 |
| | | | | 709/228 |
| 2019/0260604 | A1 * | 8/2019 | Wouhaybi | H04L 12/2823 |
| 2019/0271475 | A1 * | 9/2019 | Jung | F24C 15/16 |

FOREIGN PATENT DOCUMENTS

| | | | | |
|---|---|---|---|---|
| CN | 110123149 | A * | 8/2019 | |
| DE | 20112679 | U1 * | 10/2001 | ............... A21B 3/04 |
| DE | 102004026882 | A1 * | 12/2005 | ............... F24C 15/16 |
| EP | 1384411 | B1 * | 1/2005 | ............... A21B 3/00 |
| JP | 2016032670 | A * | 3/2016 | |

* cited by examiner

700

At an oven comprising a cooking chamber, a movable food support platform within the cooking chamber, and a control unit:

704 Detect a first event that corresponds to a start of a cooking process for a food item, wherein, at the start of the cooking process, a first heating surface of the cooking chamber is operating at a first preset output level 706 In response to detecting the first event, activate one or more actuators to move the moveable food support platform to a first position relative to the first heating surface of the cooking chamber 708 While the food support platform is at the first position relative to the first heating surface of the cooking chamber and while the first heating surface is operating at the first preset output level, detect that oven reconfiguration criteria are met, wherein the oven reconfiguration criteria includes a first requirement that at least one of a time threshold and a temperature threshold is met in order for the oven reconfiguration criteria to be met 710 In response to detecting that the oven reconfiguration criteria are met, activate the one or more actuators to move the moveable food support platform relative to the first heating surface of the oven chamber, from the first position to a second position that is distinct from the first position

Figure 7

Cooking Appliance 800

OVEN WITH AUTOMATIC CONTROL OF PAN ELEVATION

FIELD OF THE TECHNOLOGY

The present disclosure relates to the field of cooking appliances, and in particular, to systems and methods for automatic control of cooking appliances.

BACKGROUND OF THE TECHNOLOGY

Conventional food preparation systems, such as microwave ovens, stove tops, toaster ovens, electric cookers, ovens, and steamers, etc. rely on manual inputs for cooking temperatures and cooking duration specification. These conventional systems require the user to possess a substantial amount of knowledge and experience regarding how different food items should be heated and cooked to the right level of doneness without compromising food safety and flavor requirements. These conventional food preparation systems also require the user to manually perform many tasks during the entire cooking process, such as preheating, interrupting the cooking to add ingredients or redistribute the food items based on doneness (e.g., to stir, rotate, or flip food items), timely removing the food items from the heat, cooling the food items, etc. This requires a tremendous amount of time and energy on the part of the user. Any mistakes or untimeliness can result in an unsatisfactory end product (e.g., burned, overcooked, undercooked, unevenly cooked, etc.).

Some newer models of food preparation systems allow a user to select from a few preset food options, and adjust cooking time and power levels according to the user's selections. This type of preset cooking reduces cooking complexity and provides convenience to users in many cases (e.g., baking potatoes, reheating left-overs, etc.). However, such preset cooking rarely works well for food items that require more sophisticated cooking processes, such as those that require varying cooking temperatures and multiple heating methods during the cooking process.

In addition, conventional food preparation systems have many physical limitations that make automatic control of cooking difficult. For example, conventional ovens are equipped with fixed oven racks, forcing food items to stay in the same location and orientation during cooking. Although a user can open the oven during cooking and manually change the location or orientation of the food item, such an operation is cumbersome and causes cooking temperature fluctuation. Furthermore, temperature and heat power distribution inside a conventional food preparation system is often non-uniform, with regions closer to heating elements receiving higher temperature and heat power.

For these reasons, improved methods and systems for controlling functions of the cooking appliances, and assisting the users in using and interacting with the cooking appliances are desirable.

SUMMARY

As discussed in the background, improved methods and systems for controlling functions of the cooking appliances, and assisting the users in using and interacting with the cooking appliances are desirable.

The present disclosure describes a system and method for controlling oven functions that aims to cook food items with suitable temperatures and heating speed from start to finish, without excessive involvement of the user. At the start of the cooking process, the cooking chamber is heated by one or more heating elements. The food item is placed within the cooking chamber before the temperature in the cooking chamber reaches a stable value, and the distance of the food item relative to the heating element(s) is automatically selected and adjusted by a moveable food support platform in real-time based on the actual temperature distribution within the cooking chamber and the most desirable cooking temperature required for the food item in the current state of the food item. If the food item (e.g., bread roll, pizza, cake, etc.) requires lower cooking temperatures in the beginning, the food item is kept in cooler regions of the cooking chamber which is relatively far away from the heating element(s) during the preheating stage. If the food item requires higher cooking temperatures in the beginning, the food item is kept in the hotter regions of the cooking chamber which is relatively close to the heating element(s) during the preheating stage. The food item is kept at a fixed distance from the one or more heating elements during the stable heated state of the cooking chamber to cook at the normal cooking temperature for the food item. When cooking is close to being completed, the heating element is turned off to allow the cooking chamber to gradually cool; and the food item is moved increasingly close to the heating element(s) where the temperature is closest to the normal cooking temperature for the food item until the food item finishes cooking. The food item is moved to a location farther away from the heating element(s) where the temperature is cooler after the heating element(s) are turned off, to cool, while the oven overall is still too warm for the food item to cool down. The utilization of the preheating stage to start the cooking process and the ramp down stage to finish the cooking process allows for better energy utilization, reduced heating time, and the necessary temperature variations during the cooking process, without active user intervention.

In some embodiments, a pan with channels is provided to be used with the moveable food support platform, the liquid that comes out of the food item during the cooking process is directed to a part of the cooking chamber that is cooler than the location of the food item in the pan, and optionally redirected back to the food item when the food item is moved out of the high-temperature zone of the cooking chamber. This helps to avoid poor searing results and excessive smoke due to burnt food juice when the food item is placed close to the heating element during the preheating stage and normal cooking stage of the oven. This also helps to add flavor to the food item close to the end of the cooking process.

Based on the methods and systems described herein, various issues associated with conventional food preparation systems can be addressed. A user can start the cooking process by inserting the food item into the cooking chamber, and leave the rest of the cooking to the oven. Variation of cooking temperature during the cooking process is automatically accomplished by changing the distance of the food support surface and the heating elements during various stages of the oven operation. The coordination between various stages of food item cooking and oven heating and cooling allows the food to be cooked properly and efficiently, without excess energy waste and time waste. Better management of food temperature during cooking also reduces burnt food surface or juice, and reduces cleaning time and efforts on the part of the user.

In one aspect, in accordance with some embodiments, a method is performed by a computing system that is communicably coupled with a cooking appliance and that is configured to control one or more functions of the cooking appliance.

In accordance with some embodiments, a computing system includes processors and memory storing instructions that, when executed, causes the one or more processors to perform the methods described herein. In accordance with some embodiments, an electronic device includes one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device, cause the device to perform or cause the performance of the operations of any of the methods described herein. In accordance with some embodiments, an electronic device includes: means for capturing images, means for heating food items, and means for performing or causing the performance of the operations of any of the methods described herein.

As disclosed herein, in some embodiments, a method of adjusting food item locations inside an oven includes: at an oven comprising a cooking chamber, a food support platform within the cooking chamber, and a control unit: detecting a first event that corresponds to a start of a cooking process for a food item, wherein, at the start of the cooking process, a first heating surface of the cooking chamber is operating at a first preset output level; in response to detecting the first event, activating one or more actuators to move the food support platform to a first position relative to the first heating surface of the cooking chamber; while the food support platform is at the first position relative to the first heating surface of the cooking chamber and while the first heating surface is operating at the first preset output level, detecting that oven reconfiguration criteria are met, wherein the oven reconfiguration criteria includes a first requirement that at least one of a time threshold and a temperature threshold is met in order for the oven reconfiguration criteria to be met; and in response to detecting that the oven reconfiguration criteria are met, activating the one or more actuators to move the food support platform relative to the first heating surface of the cooking chamber, from the first position to a second position that is distinct from the first position.

In some embodiments, the cooking chamber has an upper heating surface and a lower heating surface, the first heating surface is one of the upper and lower heating surfaces, and the first and second positions are between the upper heating surface and the lower heating surface of the cooking chamber.

In some embodiments, at the start of the cooking process, the lower heating surface is operating at a second preset output level, and the first position is closer to the first heating surface than to the second surface and the second position is closer to the second heating surface than to the first heating surface.

In some embodiments, the method includes: in response to detecting that the oven reconfiguration criteria are met: determining a temperature distribution within the cooking chamber at a plurality of positions relative to the first heating surface; and selecting the second position for the food support surface based on the temperature distribution within the cooking chamber.

In some embodiments, selecting the second position for the food support surface is further based on a cooking parameter of the cooking process, wherein the cooking parameter includes a food item type or a cooking method specified for the cooking process.

In some embodiments, the method includes receiving a user input that specifies a third position for the food support platform that is distinct from the second position; and in response to receiving the user input that specifies the third position for the food support platform, activating the one or more actuators to move the food support platform relative to the first heating surface of the cooking chamber, from the second position to the third position.

In some embodiments, the method includes: turning off the first heating surface; and in accordance with a determination that the first heating surface is turned off, activating the one or more actuators to move the food support platform relative to the first heating surface of the cooking chamber in accordance with a current temperature distribution within the cooking chamber.

In some embodiments, the method includes: detecting a second event that corresponds to an interruption of the cooking process; and in response to detecting the second event that corresponds to an interruption of the cooking process, activating the one or more actuators to move the food support platform relative to the first heating surface of the cooking chamber in accordance with a current temperature distribution within the cooking chamber.

In one aspect, an oven includes a cooking chamber having a first surface and a second surface opposite of the first surface, a first set of heating elements on the first surface, a second set of heating elements on the second surface, a plurality of temperature sensors configured to detect temperatures corresponding to different locations within the cooking chamber between the first surface and the second surface of the cooking chamber, a support platform for supporting food items during cooking, one or more actuators that are coupled to the support platform and configured to move the support platform between the first surface and the second surface of the cooking chamber, and an oven controller unit that comprises one or more processors, memory storing instructions, the instructions, when executed by the one or more processors, cause the processors to perform operations comprising: detecting a start event that corresponds to a start of a cooking process for a food item, wherein at the start of the cooking process at least one of the first set of heating elements on the first surface and the second set of heating elements on the second surface is activated to output heat to the heating chamber at a respective power level; activating the one or more actuators to move the support platform to a first preset position between the first surface and the second surface of the cooking chamber; detecting that a preset condition being met, wherein the preset condition require that at least one of a time threshold and a food item temperature threshold being met; and in response to detecting that the preset condition is met, activating the one or more actuators to move.

Various additional advantages of the present application are apparent in light of the description below.

BRIEF DESCRIPTION OF THE DRAWINGS

The aforementioned features and advantages of the disclosed technology, as well as additional features and advantages thereof, will be more clearly understood hereinafter as a result of a detailed description of preferred embodiments when taken in conjunction with the drawings.

To describe the technical solutions in the embodiments of the presently disclosed technology or in the prior art more clearly, the following briefly introduces the accompanying drawings required for describing the embodiments or the prior art. Apparently, the accompanying drawings in the following description show merely some embodiments of the presently disclosed technology, and persons of ordinary skill in the art may still derive other drawings from these accompanying drawings without creative efforts.

FIG. 7 is a flowchart diagram of a method for performing a smart cooking process in a smart cooking appliance, in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. The described embodiments are merely a part rather than all of the embodiments of the present application. All other embodiments obtained by persons of ordinary skill in the art based on the embodiments of the present application without creative efforts shall fall within the protection scope of the present application.

Figure 1A:
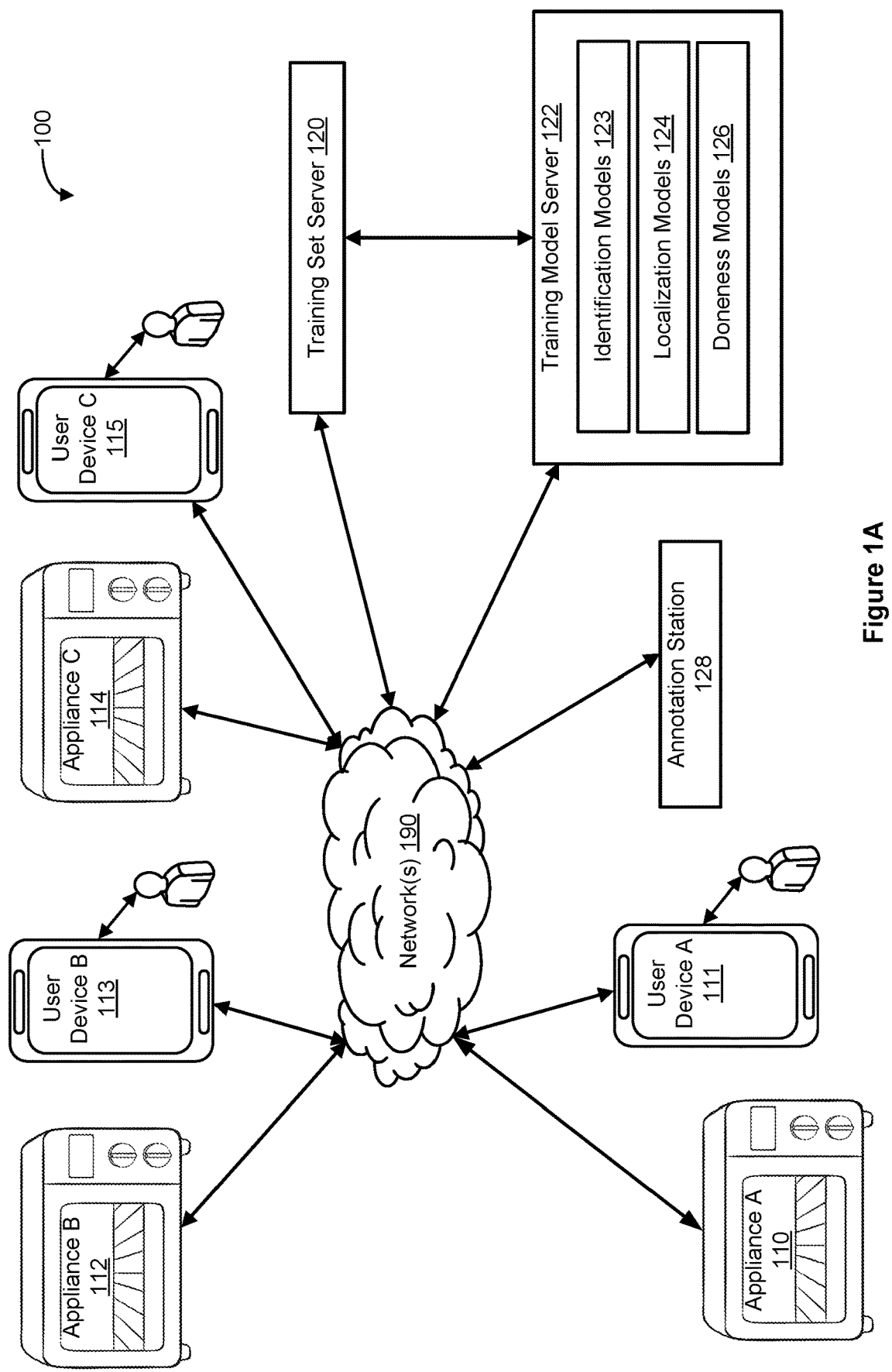
FIG. 1A shows a block diagram of an operation environment of a food preparation system (e.g., including a smart cooking appliance and related servers), in accordance with some embodiments.

FIG. 1A shows a block diagram of an operation environment 100 of a food preparation system (e.g., including a smart cooking appliance and related servers) in accordance with some embodiments.

The operation environment 100 of a food preparation system includes one or more cooking appliances (e.g., appliance A 110, appliance B 112, and appliance C 114), connected to one or more servers (e.g., training set server 120 and training model server 122), and optionally to one or more user devices (e.g., user device A 111, user device B 113, and user device C 115) and/or annotation station(s) 128, via network 190 (e.g., a wide area network such as the Internet, or a local area network such as a smart home network).

In some embodiments the one or more cooking appliances (e.g., smart ovens, smart stovetops, etc.) are configured to collect raw sensor data (e.g., image, weight, temperature, thermal map data, etc.) and send the raw sensor data to corresponding user devices (e.g., smart phones, tablet devices, etc.), annotation station 128 (e.g., workstations and desktop computers), and/or training set server 120 (e.g., server provided by the manufacturer of the cooking appliances or third-party service providers for the manufacturer). In some embodiments, the one or more cooking appliances are also configured to receive control instructions from training model server 122 and/or a corresponding user device (e.g., appliance A 110 may receive control instructions from training model server 122 to set the smart oven temperature to 425° F. for roasting vegetables and appliance A 110 may receive control instructions from user device A 111 to change the temperature to 400° F.). Additional details regarding the one or more cooking appliances (e.g., appliance A 110, appliance B 112, and appliance C 114) is described in detail with reference to other parts of the present disclosure.

In some embodiments, the one or more user devices are configured to receive raw sensor data from a respective appliance (e.g., user device A 111, which corresponds to appliance A 110, is configured to receive raw sensor data from appliance A 110). In some embodiments, the one or more user devices are also configured to send annotated data to annotation station 128 and/or training set server 120. In some embodiments, the one or more user devices are configured to generate and send control instructions to the respective appliance (e.g., user device A 111 may send instructions to appliance A 110 to turn appliance A 110 on/off or to adjust a setting on appliance A 110, such as turning on a broiler or changing the temperature of a smart oven). In some embodiments, the one or more user devices include, but is not limited to, a mobile phone, a tablet, or a computer device. In some embodiments, one or more user devices may correspond to one appliance (e.g., a computer and a mobile phone may both correspond to appliance A 110 (e.g., both are registered to be a control device for appliance A in an appliance setup process) such that appliance A 110 may send raw sensor data to either or both the computer and the mobile phone). In some embodiments, a user device corresponds to (e.g., shares data with and/or is in communication with) an appliance (e.g., user device A 111 corresponds to appliance A 110). For example, appliance A 110 may collect data (e.g., raw sensor data, such as images or temperature data) and send the collected data to user device A 111 so that the collected data may be annotated by a user on user device A 111.

In some embodiments, annotation station 128 is configured to receive collected data from the one or more appliances (e.g. appliances 110, 112, and 114) so that the collected data may be annotated by specialized annotation personnel. In some embodiments, annotation station 128 is configured to receive annotated data from the one or more user devices (e.g., user devices 111, 113, and 115) for review, editing, and/or approval by the specialized annotation personnel. In some embodiments, when annotated data from the one or more user devices have been approved at annotation station 128, annotation station sends the approved data to training set server 120 to be included in the training corpus stored at the training set server. In some embodiments, annotation station 128 retrieves annotated data from server 120 for review, editing, and/or approval by the specialized annotation personnel. In some embodiments, annotation station 128 retrieves unannotated data from server 120 for annotation by the specialized annotation personnel. Sensor data that has been annotated and/or approved at annotation station 128 is returned to server 120 for inclusion in the training corpus.

In some embodiments, training set server 120 is configured to receive raw sensor data from the one or more cooking appliances (e.g. appliances 110, 112, and 114), and/or receive annotated data from the one or more user devices (e.g., user devices 111, 113, and 115). In some embodiments, training set server 120 is also configured to send raw and/or annotated data to annotation station 128, and receive annotated and/or approved annotated data from annotation station 128. Training set server 120 is configured to preprocess the annotated data, e.g., to group, divide, and correlate the training data, and index and store the training data, in accordance with the training models and training methods employed by training model server 122. Training set server 120 is configured to send selected training data (e.g., data that includes, corresponds to, or is based on annotated data that has been approved at annotation station 128) to training model server 122, in accordance with the particular training model requesting the training data.

In some embodiments, training model server 122 is configured to receive training data from training set server 120. Training model server is also optionally configured to send control instructions (e.g., machine instructions prepared according to the control protocols of a particular cooking appliance) and/or send text data (e.g., text messages) to the one or more appliances and/or user devices. Training model server 122 includes identification models 123 (e.g., also referred to as food item identity determination model"), localization models 124 (e.g., also referred to as "food item location and outline determination model"), and doneness models 126 (e.g., also referred to as "cooking progress level determination model"). Identification models 123 are related to identifying food items being cooked in a cooking appliance. Localization models 124 are related to locating food items currently being cooked in a cooking appliance. For example, localization models 124 may be used to identify two pieces of chicken on a left side of the oven rack of the smart oven and four cookies on the right side of the oven rack of the smart oven, and outline each of them in an image captured by the smart oven. Doneness models 126 are related to determining the cooking progress level or the "done-ness" of food items present in a cooking appliance. For example, doneness models 126 may include models for determining whether a food item is fully cooked (e.g., doneness models 126 may allow a smart stovetop to determine that a piece of steak is cooked to medium-rare) or 80% cooked. Training model server 122 trains identification model 123, localization models 124 and/or doneness models 126 based on training data received from training set server 120. Once the training of identification models 123, localization models 124 and doneness models 126 are sufficiently completed (e.g., achieved a threshold level of accuracies), the training set server 120 receives requests from cooking appliances to determine food item identities and locations, and/or cooking progress levels of food items in real-time based on sensor data captured by the cooking appliances. In some embodiments, the cooking progress levels determined by the training set server 120 is provided back to the requesting cooking appliances, such that each cooking appliance determines an appropriate action, e.g., changing an operation of the cooking appliance and/or alerting a user, based on the determined cooking progress levels.

In some embodiments, cooking appliances (e.g. appliances 110, 112, and 114), user devices (e.g., user devices 111, 113, and 115), annotation station 128, training set server 120, and training model server 122 are connected (e.g., sharing data with and/or in communication with) through one or more networks 190. One or more networks 190 may include wired and wireless networks and may be a local area network of a home or a wide area network (e.g., Internet).

Figure 1B:
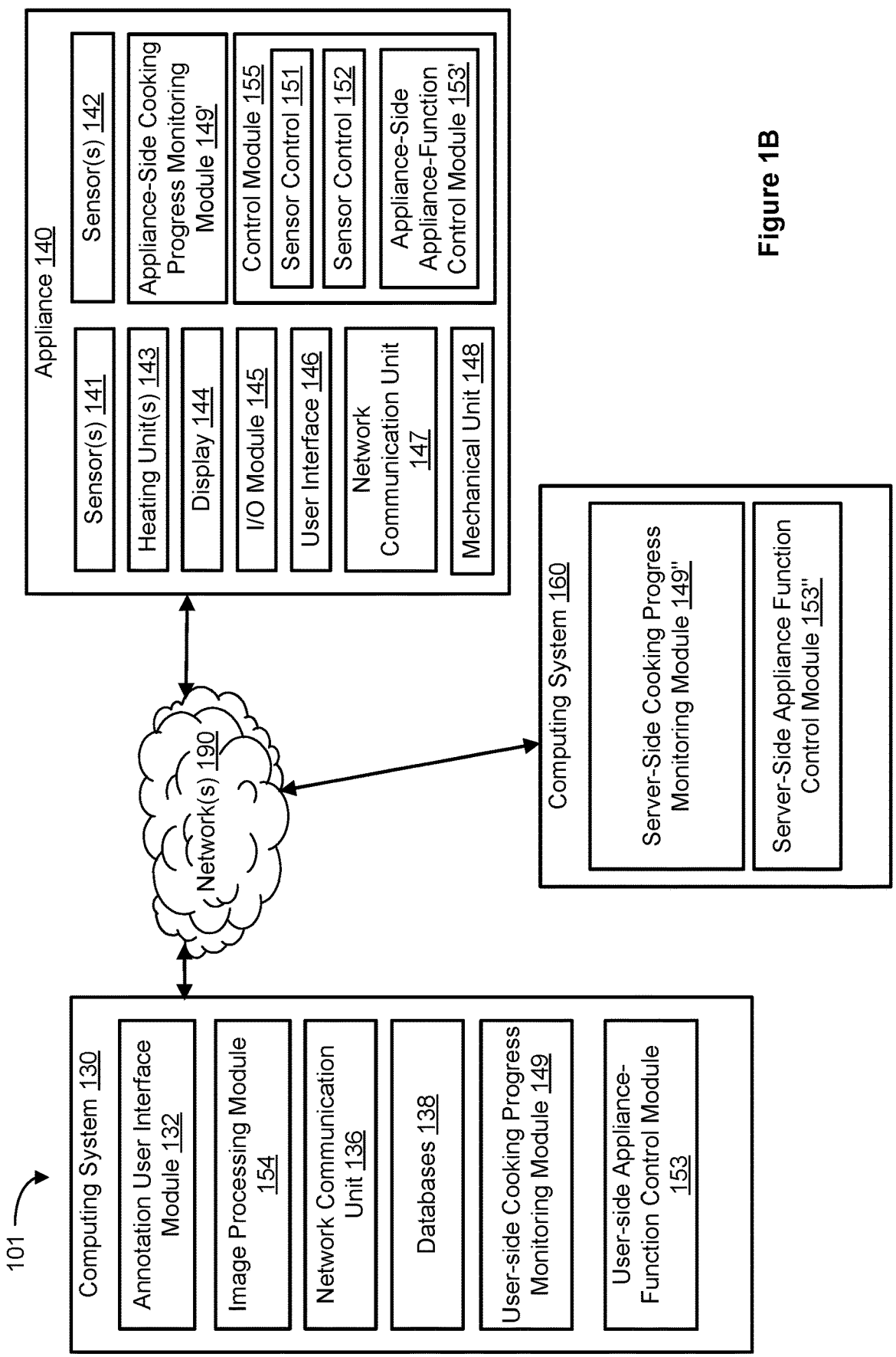
FIGS. 1B-1C show block diagrams of a food preparation system, in accordance with some embodiments.

FIG. 1B show block diagrams of a food preparation system 101 in accordance with some embodiments.

In some embodiments, as shown in FIG. 1B, food preparation system 101 includes cooking appliance 140 and computing system 130 that is implemented separately from cooking appliance 140. Cooking appliance 140 can serve as any of cooking appliances 110, 112, and 114 in FIG. 1A. In some embodiments, computing system 130 is in communication with cooking appliance 140 through one or more networks 190. In some embodiments, computing system 130 is implemented on a user device (e.g., in association with a user application for controlling and interacting with the cooking appliance). In some embodiments, computing system 130 and appliance 140 further communicate with computing system 160 to accomplish some of the functions on computing system 130 and appliance 140 in accordance with a client-server configuration. In some embodiments, computing system 160 is implemented on a server of a manufacturer of the cooking appliance (e.g., on training model server 122). In some embodiments, computing system 160 is implemented on a standalone computer (e.g., on a local server of a smart home).

Referring to FIG. 1B, computing system 130 includes one or more of annotation user interface module 132, imaging processing module 154, network communication unit 136, and one or more databases 138. which corresponds to user devices as described above with respect to FIG. 1A (e.g., user devices 111, 113, and 115). In some embodiments, computing system 130 further includes user-side cooking progress monitoring module 149 and user-side appliance-function control module 153 to facilitate the cooking progress monitoring and appliance control aspects of the food preparation system, in addition to the data collection and annotation aspect of the food preparation system as described herein.

In some embodiments, annotation user interface module 132 allows a user of computing system 130 to view and annotate raw sensor data received from a corresponding appliance 140 (e.g., appliance 110, 112, or 114). For example, a user may use an application on their user device (e.g., user device 111, 113, or 115) to view images and temperature data recorded by a corresponding appliance. The user may be able to add annotations and details to the collected data, described in further detail below with respect to FIG. 3, for example.

In some embodiments, image processing module 154 obtains images captured by imaging system of appliance 140 and processes the images for analysis. The functions of image processing module 154 and imaging system of appliance 140 are described below with respect to FIG. 2, for example.

Network communication unit 136 allows computing system 130 to communicate with appliance 140 and/or computing system 160 over one or more networks 190.

In some embodiments, databases 138 include a database of previously captured images of food items or images from other similar food preparation systems. In some embodiments, databases 138 includes ingredient databases that allow the computing system to provide nutritional information and recipes to the user.

In some embodiments, computing system 130 includes an application that provides user-side functions, such as user-side cooking progress monitoring and appliance-function control, in conjunction with computing system 160 and appliance 140. In some embodiments, the application also provides access to a social network for the user to exchange cooking images and recipes with others using the same or similar appliances, and/or to contact the manufacturer or service providers for information and services related to the appliance 140.

In some embodiments, user-side cooking progress monitoring module 149 is configured to determine cooking progress of food items based on real-time sensor data captured by appliance 140 using food item location and outline determination models and food cooking progress level determination models that have been trained on computing system 160. In some embodiments, user-side cooking progress monitoring module 149 is configured to determine the cooking progress of food items locally using a local copy of the food item location and outline determination models and food cooking progress level determination models. In some embodiments, the user-side cooking progress monitoring module 149 sends a request to computing system 160, and receive the determination results in real-time from the computing system 160. The request includes real-time sensor data captured by appliance 140, and the results are determined using food item location and outline determination models and food cooking progress level determination models that have been trained on computing system 160.

In some embodiments, user-side appliance-function control module 153 is configured to provide a user interface for the user to directly control the appliance functions (e.g., turning the appliance on/off or setting an appliance parameter, etc.), and/or automatically generate control instructions based on the result of the cooking progress monitoring. In some embodiments, the result of the cooking progress monitoring is provided to the user-side appliance-function control module 153 from the user-side cooking progress monitoring module 149. In some embodiments, the result of the cooking progress monitoring is provided to the user-side appliance-function control module 153 from computing system 160. In some embodiments, the result of the cooking progress monitoring is provided to the user-side appliance-function control module 153 from appliance 140.

In some embodiments, appliance 140 includes one or more first sensors (e.g., sensors 141), one or more heating units 143, display 144, I/O module 145, user interface 146, network communication unit 147, mechanical unit 148, control module 155, imaging system, and, optionally, appliance-side cooking progress monitoring module 149'. Control module 155 includes an optional appliance-side appliance-function control unit 153'.

In some embodiments, the one or more first sensors 141 are configured to capture structured data, such as temperature, weight, and/or humidity. Structured data, as discussed herein, refers to quantitative or state data such as temperature, humidity, time, on/off, oven mode, etc. For example, the one or more first sensors 212 may be a temperature sensor (e.g., thermometer) or a humidity sensor, or weight sensor on the food support platform of the cooking appliance 140.

In some embodiments, the one or more heating units 143 are configured to heat at least a portion of the cooking compartment of the appliance (e.g., a heating coil configured to heat a cooking chamber). Further examples of the function of one or more heating units 143 are provided below with respect to FIG. 2, for example.

In some embodiments, appliance 140 includes a display 144 that can provide information about appliance 140 to a user (e.g., the broiler function of the smart oven is currently turned on). In some embodiments, display 144 may be integrated with I/O module 145 and user interface 146 to allow the user to input information into or read out information from appliance 140. In some embodiments, display 144 in conjunction with I/O module 145 and user interface 146 provides recommendations, alerts and nutritional information to the user and receive control instructions from the user (e.g., via hardware and/or software interfaces provided by appliance 140). In some embodiments, display 144 may be a touch screen display or a display that includes buttons. In some embodiments, display 144 may be a simple display with no touch-screen features (such as a conventional LED or LCD display) and user interface 146 may be hardware buttons or knobs that can be manually controlled. In some embodiments, user interface 146 optionally includes one or more of the following a display, a speaker, a keyboard, a touch-screen, a voice input-output interface etc.

Network communication unit 147 is analogous in function to network communication unit 136. Network communication unit 147 allows appliance 140 to communicate with computing system 130 and/or computing system 160 over one or more networks 190.

Mechanical unit 148 described herein refers to hardware and corresponding software and firmware components of appliance 140 that are configured to physically change the internal sensing (e.g., imaging), heating and/or food layout configuration of the cooking appliance 140. For example, the one or more first sensors 141 may correspond to a mechanical unit such that the one or more sensors 141 are movable to scan a respective area in a cooking compartment of appliance 140 (e.g., a motor may be configured to move a sensor across a predetermined area in order to capture data across the predetermined area). In another example, the food support platform of the cooking appliance may correspond to a mechanical unit including motors and/or robotic arms to change the relative positions of the heating elements and various parts of the food supporting platform, and/or to move food items to different parts of the food support platform or food storage compartment inside the cooking appliance. In some embodiments, the mechanical units 148 of the appliance 140 are operated in accordance with instructions from the appliance-function control unit of the food preparation system (e.g., appliance-side appliance-function control module 153', user-side appliance-function control module 153, and/or server-side appliance-function control module 153").

In some embodiments, appliance-side cooking progress monitoring module 149' is configured to monitor food that is present in a cooking compartment or cooktop of appliance 140. For example, appliance-side cooking progress monitoring module 149' may, based on raw data recorded by the one or more first sensors 212 and/or the one or more second sensors 214, determine that the food has been cooked to medium doneness. In some embodiments, appliance-side cooking progress monitoring module 149' is configured to determine cooking progress of food items based on real-time sensor data captured by sensors 141 and imaging system using food item location and outline determination models and food cooking progress level determination models that have been trained on computing system 160. In some embodiments, appliance-side cooking progress monitoring module 149' is configured to determine the cooking progress of food items locally using a local copy of the food item location and outline determination models and food cooking progress level determination models. In some embodiments, the appliance-side cooking progress monitoring module 149' sends a request to computing system 160, and receive the determination results in real-time from the computing system 160. The request includes real-time sensor data captured by appliance 140, and the results are determined using food item location and outline determination models and food cooking progress level determination models that have been trained on computing system 160.

In some embodiments, imaging system includes one or more second sensors 142. The one or more second sensors 142 are configured to capture unstructured data. Examples of unstructured data include RGB images and thermal or infrared images. For example, the one or more second sensors 142 may be configured to capture or record still images or videos of the food present in a cooking compartment or cooktop of appliance 140. Further examples of the function of the one or more second sensors 214 are provided below with respect to FIG. 2A. In some embodiments, imaging system includes a data storage system that stores the dimensions of the food cooking compartment, and the dimensions of the reference markers within the food cooking compartment, the distances between the camera and the various reference markers within the food cooking compartment, such that images taken by the cameras can be used to accurately determine the size and shape of the food items within the images. Thus, the imaging system eliminates the problems with conventional imaging systems which require the user's special attention to place a reference marker within the images or use images without the benefit of the size and location and orientation information of the items within the images. In some embodiments, the imaging system includes an image capture triggering system. For example, in some embodiments, the image capturing is triggered when the image capture triggering system detects that there has been a change in the field of view of the camera. For example, when the oven door is opened, the lighting condition in the oven will be changed, and the image capturing will be triggered in response to the opening of the oven door. In some embodiments, the image capturing is triggered when the food item starts to appear in the field of view of the camera. In some embodiments, the image capturing is triggered when then food item is completely inserted and the oven door is closed. In some embodiments, the image capture trigger system also instructs the camera to capture and store an image of the oven rack immediately before the oven door is opened, as the compartment baseline image of the interior of the oven. In some embodiments, the image capturing is triggered manually in response to a user's input, for example, after the user has inserted the food item into the food cooking compartment. Manual trigger is easier and less complicated to implement, and allows the user to purposefully capture images that best reflect the characteristics of the food item for ingredient recognition. In some embodiments, image processing module 154 obtains the images captured by the one or more second sensors 142, and preprocesses the images to remove the background from the images based on the compartment baseline image captured before the insertion of the food item. The compartment baseline image captures the exact condition of the food support platform in the food cooking compartment of the food preparation system, and provides an excellent filter for the images containing the food item to remove the background.

In some embodiments, control module 155 includes sensor control 151, sensor control 152, and appliance-side appliance-function control module 153'. Sensor control 151 is configured to control and adjust the one or more first sensors 141. For example, sensor control 151 may send instructions for the one or more first sensors 141 to record temperature data at 1-minute intervals. Sensor control 152 is configured to control and adjust the one or more second sensors 142. For example, sensor control 152 may send instructions for the one or more second sensors 142 to be moved along a first direction and to take capture a picture when the one or more second sensors 142 are at the starting position before being moved and at the final position after being moved.

Appliance-side appliance-function control module 153' is configured to control and adjust the various functions of appliance 140. For example, appliance-side appliance-function control module 153' may send instructions to heating units 143 to activate a first heating unit of the one or more heating units, or may send instructions to mechanical unit 148 to change the relative position of the food support platform. In some embodiments, appliance-side appliance-function control module 153' generates and send control instructions to various components of the appliance 140 based on preconfigured operation protocols (e.g., to implement the normal routine functions of the appliance 140). In some embodiments, appliance-side appliance-function control module 153' generates and send control instructions to various components of the appliance 140 based on real-time cooking progress monitoring of the food items within the cooking appliance (e.g., to adjust functions of the appliance 140 automatically without user intervention based on preset reactions protocols or programs). In some embodiments, appliance-side appliance-function control module 153' generates and send control instructions to various components of the appliance 140 based on real-time user instructions received from user devices or via user interface 146 of appliance 140. In some embodiments, the result of the cooking progress monitoring is provided to the appliance-side appliance-function control module 153' from the user-side cooking progress monitoring module 149. In some embodiments, the result of the cooking progress monitoring is provided to the appliance-side appliance-function control module 153' from computing system 160. In some embodiments, the result of the cooking progress monitoring is provided to the appliance-side appliance-function control module 153' from appliance-side cooking progress monitoring module 149'.

In some embodiments, computing system 160 includes server-side cooking progress monitoring module 149" and server-side appliance-function control module 153". In some embodiments, the server-side cooking progress monitoring module 149" employs identification models 123, localization models 124 and doneness models 126 shown in FIG. 1A to determine food item identity, location, outlines, and/or cooking progress levels of food items from real-time sensor data received from cooking appliance 140 (e.g., directly or through computing system 130). In some embodiments, computing system 160 is implemented by training model server 122 in FIG. 1A, for example.

The functions of various systems within food preparation system 101 in FIG. 1B are merely illustrative. Other configurations and divisions of the functionalities are possible. Some functions of one sub-system can be implemented on another sub-system in various embodiments.

Figure 1C:
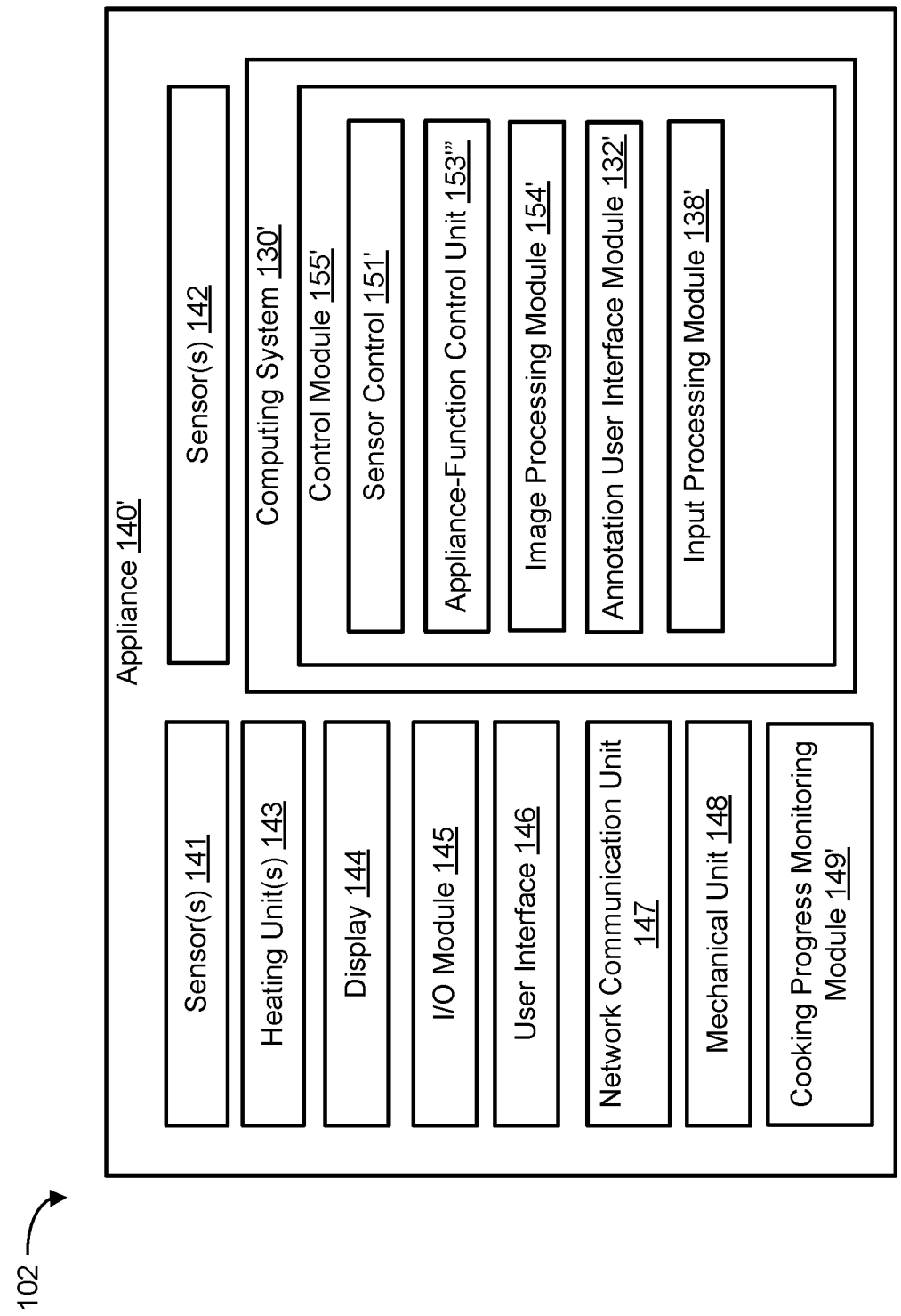

In some embodiments, as shown in FIG. 1C, food preparation system 102 includes a computing system 130' that is integrated with appliance 140'. In some embodiments, computing system 130' communicates with computing system 160' to accomplish some of the functions of appliance 140'. In some embodiments, appliance 140' optionally communicates with computing system 160 to outsource some of the functions of appliance 140'.

Referring to FIG. 1C, appliance 140' has a built-in computing system 130'. Appliance 140' includes sensors 141, heating unit(s) 143, display 144, I/O module 145, user interface 146, network communication unit 147, mechanical unit 148, and imaging system. These components of appliance 140' correspond to those in appliance 140 and have similar functionalities that will not be repeated herein for brevity.

In some embodiments, computing system 130' within appliance 140' includes control unit 155', sensor control 151', sensor control 152', appliance-side cooking progress monitoring system 149''', appliance-side appliance-function control module 153''', image processing system 154', databases 138', and appliance-side annotation user interface module 132'. The functions of these components correspond to their respective counterparts with the same names in appliance 140 (e.g., sensor control 151' has the same function as sensor control 151) and will not be repeated for brevity. In some embodiments, annotation user interface module 132''' may allow a user to view and annotate raw user data on a user device, separate from appliance 140. In comparison, appliance-side annotation user interface module 132' may allow a user to view and annotate raw user data on display 144 of appliance 140' and/or annotate the cooking progress levels of food items in the images with voice input.

The above examples are provided merely for illustrative purposes. More details of the functions of the various components are set forth below with respect to other figures and illustrations. It can be understood that one or more components described herein may be used independently of other components.

Figure 2:
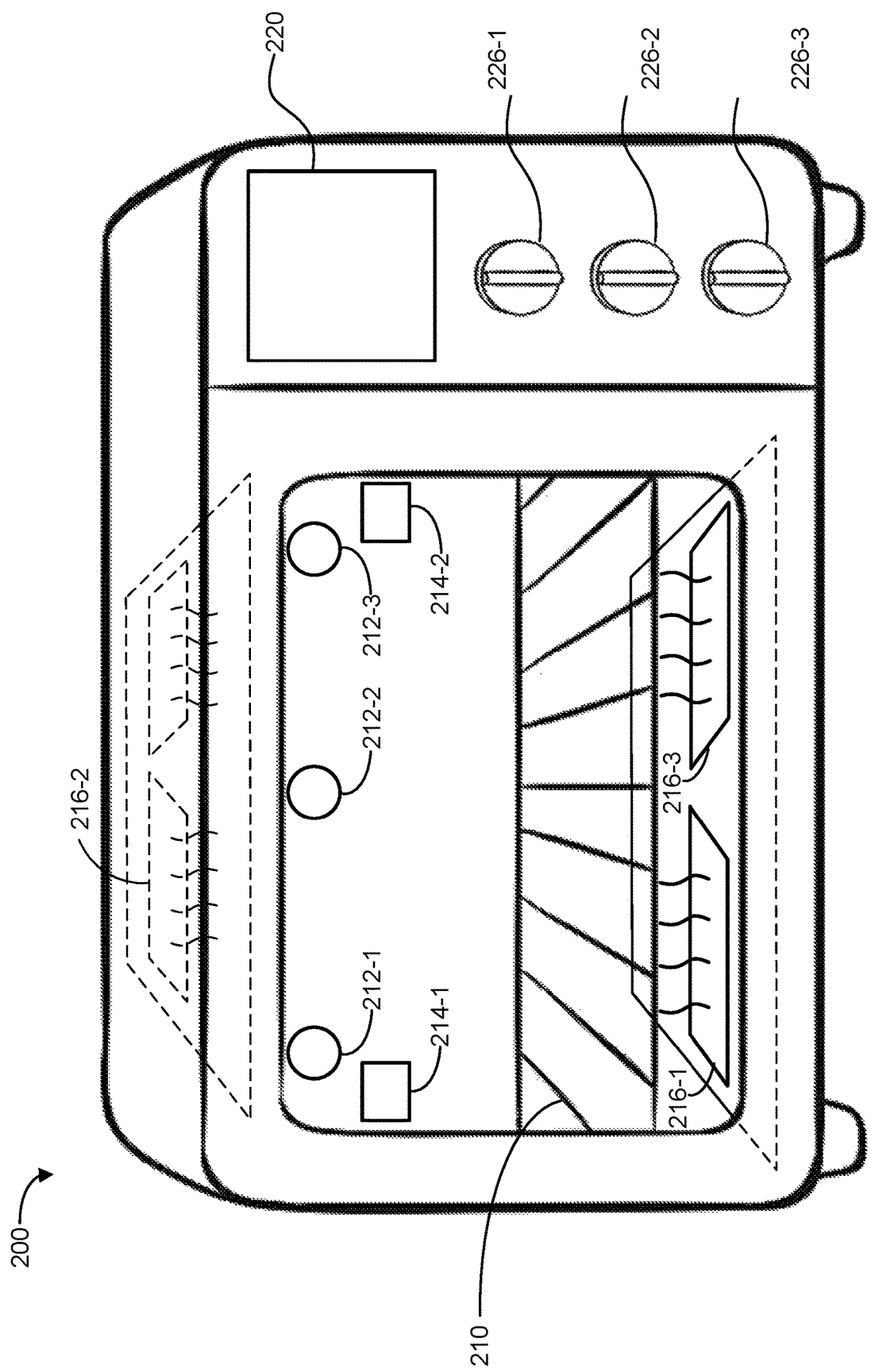
FIG. 2 is a schematic of a smart cooking appliance with a cooking chamber, in accordance with some embodiments.

FIG. 2 is a schematic of a smart cooking appliance 200 with a cooking chamber that is configured to be used in the smart cooking appliance. In some embodiments, the smart cooking appliance is a smart oven (e.g., a wall oven, a toaster oven, a convection oven, a lidded grill oven, etc.) with an enclosed cooking chamber that has one or more heating surfaces. In some embodiments, the heat distribution within the enclosed cooking chamber is accomplished through radiation and convection (e.g., with or without the aid of a fan). In some embodiments, the smart cooking appliance has a function to heat the cooking chamber to a preset temperature and maintaining the cooking chamber at the preset temperature for an extended period of time. As shown in FIG. 1, an exemplary smart oven 200 includes a cooking chamber with six sides, front, back, left, right, top, and bottom sides.

Referring to FIG. 2, cooking appliance 200 includes food support platform 210 that is configured to support and hold food items (e.g., an oven rack in an oven, a pan on a stovetop, a plate in a microwave, a basket in an air fryer). Although only one food support platform 210 is shown in FIG. 2, cooking appliance 200 may include one or more food support platforms. In some embodiments, food support platform 210 includes mechanical unit 148 that can move and/or adjust a configuration of food support platform 210. For example, turning and churning mechanisms such as stirrers, rotisseries, and fans are configured to turn or rotate food items and redistribute the heat or the heating units around the food items. For example, a barbeque spit may be able to rotate in order to evenly cook food. In another example, an oven rack may have an adjustable height to move food towards or away from a broiler.

In some embodiments, cooking appliance 200 also includes one or more first sensors 141 (e.g., shown as first sensors 212-1, 212-2, and 212-3 in FIG. 2) and one or more second sensors 142 (e.g., shown as second sensors 214-1 and 214-2 in FIG. 2). For example, the one or more first sensors 212 and the one or more second sensors 214 may be located in situ. In some embodiments, the positions of one or more first sensors 212 and/or the one or more second sensors 214 are movable and/or adjustable. For example, cooking appliance 200 may include two first sensors that scan a respective predetermined area of the interior of cooking appliance 200. For example, the one or more second sensors 142 are part of an in situ imaging system (e.g., imaging system) that includes one or more still image cameras or video cameras (e.g., second sensors 214-1 and 214-2) that are installed at a location within or in proximity to the cooking appliance 200 such that the field of view of the cameras encompass the interior of the compartment in which food items will be inserted and cooked, or an exposed cooking surface of the cooking appliance (e.g., the heating surface of a grill pan or electric wok). The one or more second sensors 142 are directed to a food support surface 210 of cooking appliance 200. Each sensor of the one or more second sensors 142 can be located either inside of the cooking compartment of food preparation system 200 (e.g., see FIG. 2B, inside toaster oven 201) or directly above the food support surface. In some embodiments, the positions and orientations of one or more second sensors 142 are movable and/or adjustable. For example, food preparation system 200 may include two first sensors that scan a respective predetermined area of the interior of food preparation system 200. For example, the one or more cameras are optionally installed in the interior top wall of a smart oven, with a field of view of the top of the oven rack. Another camera is optionally installed on the top side edge of the interior of the oven, with a field of view of the oven rack from the side over the oven rack. In some embodiments, the camera is installed on the exterior of the compartment in which the food is cooked, and points at the location of the food item through a transparent window (e.g., a thermal insulating window). In some embodiments, the camera is placed outside of the compartment or over the platform on which the food items will be placed.

In some embodiments, cooking appliance 200 also includes one or more heating units 143 (e.g., shown as heating units 216-1, 216-2, and 216-3 in FIG. 2). For example, heating units 216-1, 216-2, and 216-3 may be three heating coils or three sections of an induction cooking surface. In some embodiments, heating units 216-1, 216-2, and 216-3 can be separately controlled to heat different portions of the cooking compartment or cooktop of food preparation system 200. Each heating unit is configured to respectively heat a predetermined area of the cooking compartment of food preparation system 200 so that different areas of the cooking compartment or stovetop can have different temperatures or heat up at different rates. This may be desirable for simultaneously cooking different types of food. For instance, heating unit 216-1 may be set at a first temperature or power for cooking chicken located in a first area of the cooking compartment and heating unit 216-2 may be set at a second temperature or power for cooking vegetables located in a second area of the cooking compartment so that the chicken and vegetables may be cooked concurrently at different temperatures and/or with different rates. In some embodiments, the positions and orientations of the one or more heating units 216 are movable and have adjustable parts such that they can be moved within the cooking compartment.

In some embodiments, cooking appliance 200 also includes display 220, serving as display 144 as described in FIGS. 1B and 1C. In some embodiments, display 220 is also a user interface (e.g., see FIGS. 1B and 1C, user interface 146) that allows users to input information (e.g., set a timer, start the appliance, set the temperature, set the cooking mode, snap a picture of the food items, query cooking status of food items, select an auto-generated cooking recipe, etc.) as well as receive information from food preparation system 200 (e.g., current temperature in cooking compartment/stovetop, time lapsed, food item identity, quantity, appearance, cooking progress level, predicted cooking results, cooking action recommendations, etc.).

In some embodiments, cooking appliance 200 also includes controls 226 (e.g., control knobs 226-1, 226-2, 226-3) that are used to adjust the cooking parameters of food preparation system 200 (e.g., adjust the power output of the heating units, cooking method, cooking temperature, heat distribution, cooking time). For example, control knob 226-1 may be used to control the temperature of heating unit 216-1. In some embodiments, controls 226 includes one or more of buttons, knobs, and touch-screen controls that respond to manual adjustments and to the control instructions (e.g., control instructions received from appliance-function control module 153, 153', or 153"). In some embodiments, controls 226 are incorporated into the display and user interface of food preparation system 200, as described above, such that the display and user interface allows the user to control and adjust the cooking functions and cooking parameters of food preparation system 200. For example, a user may input a desired temperature on the display of an oven and the oven may display the current temperature of the oven as well.

Figure 3:
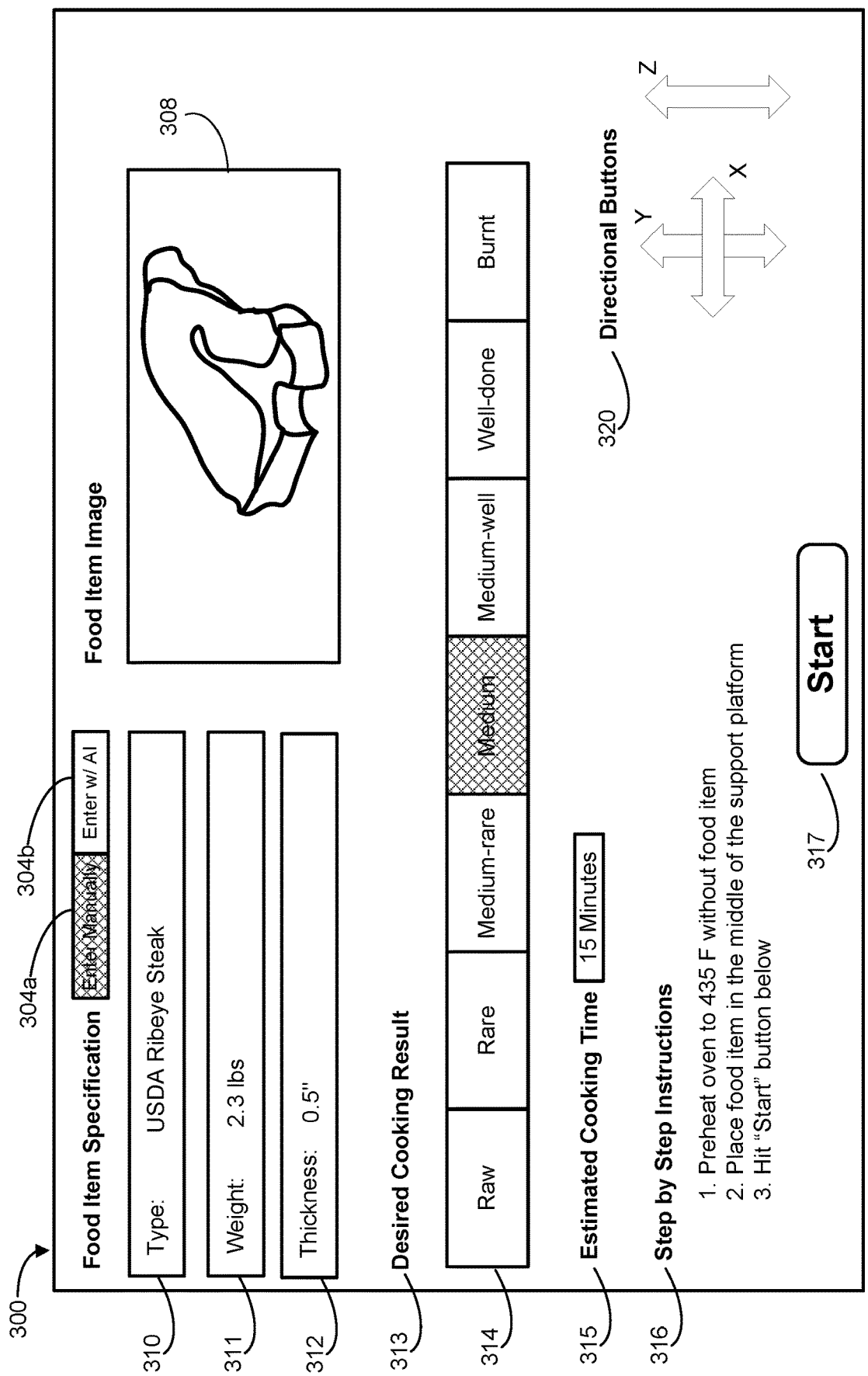
FIG. 3 illustrates an exemplary graphical user interface for configuring a smart cooking process in a smart cooking appliance, in accordance with some embodiments.

FIG. 3 illustrates an exemplary graphical user interface for configuring a smart cooking process in a smart cooking appliance. For example, graphical user interface 300 can be displayed on a touch-sensitive display of the smart cooking appliance (e.g., display 220 of FIG. 2) to receive from and display information to a user. Based on received user inputs, a computing system (e.g., computing system 130' of FIG. 2) of the smart cooking appliance generates cooking steps and user instructions to prepare a food item accordingly.

In some embodiments, when "enter manually" button 304a is selected, graphical user interface 300 allows the user to enter food item parameters values manually. Examples of food item parameter include food item type 310, food item weight 311, food item thickness 312, and so on. Once the user enters a specific food item parameter value, additional corresponding food item parameters will be displayed to help the user to further characterize the food item. For example, if the user enters the value "USDA Ribeye Steak" for the food item parameter "Type," additional parameters "Weight" and "Thickness" will be displayed on graphical user interface 300. In another example, if the user enters the value "Fish" for the food item parameter "Type," an additional parameter "Sub-Type" will be displayed allowing the user to select a specific type of fish, such as "Salmon," "Cod," "Bass," and so on. The correspondence and display order of the food item parameters are organized and stored in local memory or a remote database (e.g., databases 138 of FIG. 1C), and can be updated for more accurate food item characterization.

In some embodiments, the user enters a unique barcode associated with the food item for automatic food item parameter value extraction. In response to receiving the barcode, the computing system of the smart cooking appliance searches an online database via a network (e.g., network 190 of FIG. 1C) to automatically download values of relevant food item parameters and display them on graphical user interface 300.

In some embodiments, when "Enter with AI" button 304b is selected, the smart cooking appliance uses AI programs (e.g., identification models 123 of FIG. 1A) to automatically characterize the food item. For example, to use the AI program, the user can place the food item on the food support platform inside the cooking chamber. Cameras and sensors inside the cooking chambers (sensors 141 and 142) capture images and other parameter values of the food item, and use AI programs such as image recognition algorithms to identify the food item. In some examples, an image of the food item 308 is displayed on graphical user interface 300 in real-time for the user to view the food item and to confirm the extracted values. Sensors inside the cooking chamber can record RGB images of the food item, thermal images of the food item, weight of the food item, moisture level of the food item, and so on. Collected data are analyzed by identification models 123 over network 190 to return parameters values such as food type, size, weight and so on. The AI programs then auto-populate and display the parameter values on graphical user interface 300. In some embodiments, the user can correct the AI generated parameter values by manually overwriting the parameter values on graphical user interface 300. These manual feedbacks are registered by annotation user interface module 132' and sent to training model servers (e.g., training model server 122) to fine-tune the AI models.

Once food item parameter values have been entered, either by the user or by the AI programs, graphical user interface 300 allows the user to select desired cooking result 313. Desire cooking result 313 is dependent on food item parameter values. For example, when the type of food item is "steak," the user is presented with several options 314 for preparing the steak with different doneness, from "raw" to "burnt." After the user selects the desired cooking result, the computing system of the smart cooking appliance generates cooking instructions. For example, the cooking instructions comprise control instructions for various components of the smart cooking appliance. In some embodiments, based on the generated cooking instructions, graphical user interface 300 displays an estimated cooking time 315.

In some embodiments, there are steps that need to be performed manually by the user before automated cooking starts. For example, to prepare a steak, the smart cooking appliance has to be preheated to a certain temperature before the food item can be inserted to the cooking chamber. If the food item has been previously placed on the food support platform (e.g., for using AI programs for auto-identification), the user is asked to remove the food item from the food preparation system, preheat the smart cooking appliance, and insert the food item back into the cooking chamber when preheating finishes. Step by step instructions 316 are displayed on graphical user interface 300 to notify the user of these steps. If the user does not follow these step (e.g., the user hits "start" button 317 without preheating), the smart cooking appliance provides a warning and would not start cooking.

In some embodiments, graphical user interface 300 includes directional buttons 320 that allow the user to manually control movements of the food support platform during operation. For example, the user can view changes in food item condition using real-time food item image 308 to manually adjust the location of the food item in the cooking chamber.

Figure 4:
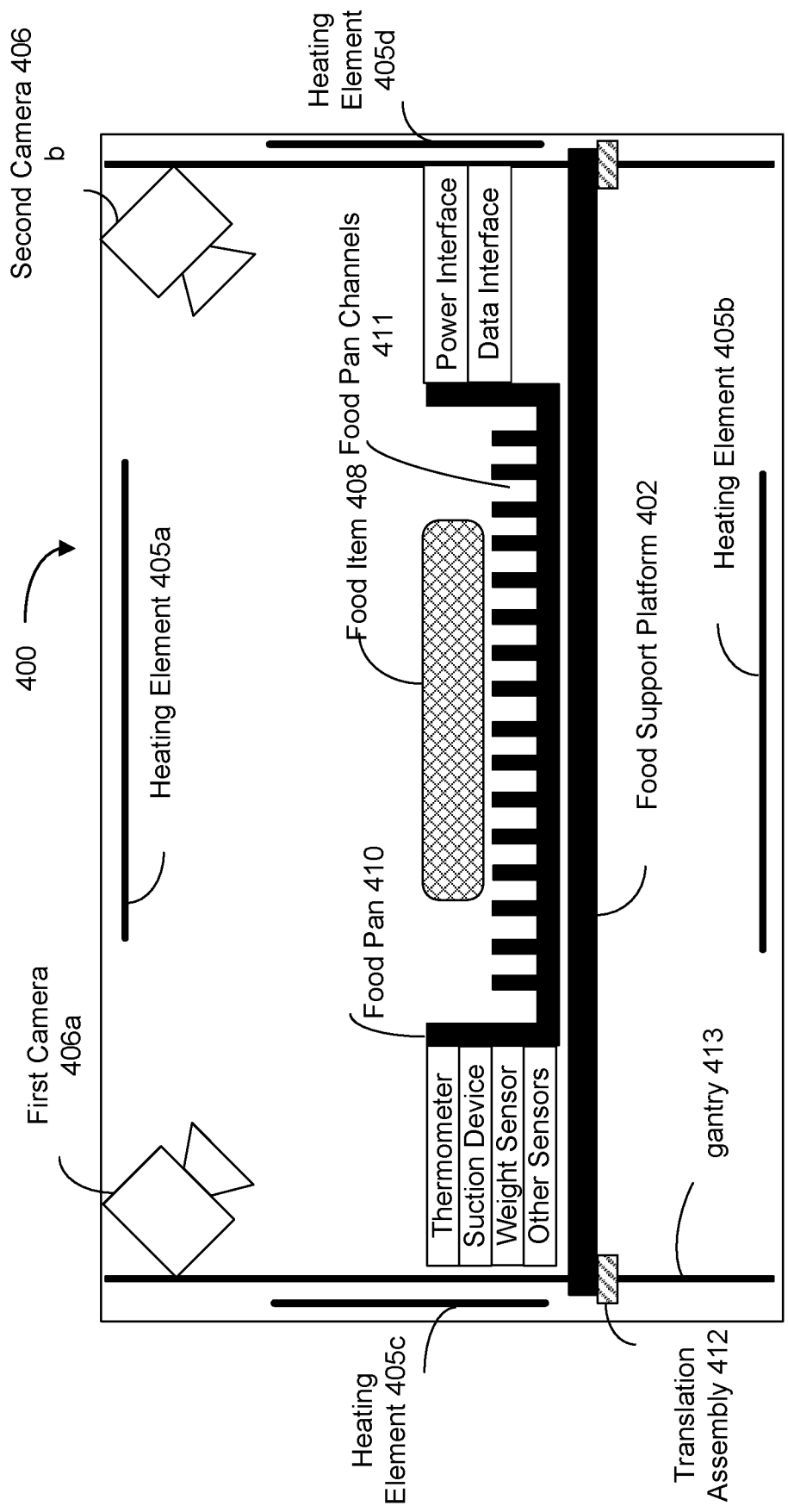
FIG. 4 illustrates a cooking chamber of a smart cooking appliance, in accordance with some embodiments.

FIG. 4 shows a cooking chamber 400 of a smart cooking appliance in accordance with some embodiments. Cooking chamber 400 is an insulated environment inside the smart cooking appliance where food items are being prepared. Cooking chamber 400 includes various hardware components controlled by one or more control modules (e.g., control module 155 of FIG. 1B) to prepare a food item according to instructions.

In some embodiments, the cooking chamber 400 includes a food support platform 402, heating elements 405a-405d, a first camera 406a, a second camera 406b, a food pan 410, and a translation assembly 412. These components are heat-resistant and coupled to computer systems located outside cooking chamber 400 with heat-resistant data and power links.

Heating elements 405a-405d are located on one or more surfaces of cooking chamber 400 to direct heat power towards the inserted food item. For example, heating elements 405a-405d can be radiant heat tubes, ceramic fiber tubes, resistance coils, and other devices that convert electric energy into heat energy. In some embodiments, heating elements 405a-405d have different geometries such as coils, ribbons, corrugations, and so on. Heating elements 405a-405d are controlled by an appliance-function control unit of the computing system (e.g., appliance-function control unit 153''' of FIG. 1C) to adjust power levels, such as by changing the amount of current going through each heating element.

First camera 406a and second camera 406b are heat-resistant image-capturing devices positioned inside cooking chamber 400. First camera 406a and second camera 406b are set up to provide live view or snapshots of cooking chamber 400 during cooking. In some embodiments, first camera 406a and second camera 406b record images at different wavelength ranges. For example, first camera 406a can be an RGB camera that records images of the food item in the visible light spectrum, while second camera 406b can be an infrared camera that records thermal images of the food item. The recorded images are transferred in real-time via heat resistant data links to an image processing module (e.g., image processing module 154' of FIG. 1C) of the computing system for analysis. For example, the image processing module can use the combined thermal images and RGB images to identify food item parameters values and conditions such as food item type, size, location, temperature, weight, and so on. The image processing module can use one or more trained AI models (e.g., identification models 123, localization models 124, and doneness models 126 of FIG. 1A) to perform these identification tasks. In some embodiments, the identified food item values are passed to an input processing module (e.g., input processing module 138') of the computing system to configure automated cooking. Although only first camera 406a and second camera 406b are mentioned, in actual implementation, more image capturing devices can be used to provide more detail recording of the food item during cooking.

Food support platform 402 is a movable platform secured to gantry 413 for vertical and/or horizontal translation inside cooking chamber 400. Movement of food support platform 402 along gantry 413 is controlled by translation assembly 412. Translation assembly 412 is controlled by one or more software modules in a computing system (e.g., appliance-function control unit 153''' of FIG. 1C). Translation assembly 412 includes step motors, gearboxes, threaded rods, conveyer belt, pulleys, and/or other mechanical units for causing linear movements. In some embodiments, translation assembly 412 is secured to food support platform 402. For example, translation assembly 412 can include step motors and gearboxes attached to food support platform 402. As step motors actuate, gearboxes start to engage with threaded rods running parallel to gantry 413, causing food support platform 402 to move along gantry 413. In some embodiments, translation assembly 412 is affixed to cooking chamber 400 and uses pulleys and conveyor belts to translate food support platform 402 along gantry 413 while translation assembly 412 remains fixed in place. In some embodiments, end switches are located at the ends of gantry 413 to limit the range of movement for food support platform 402.

Food pan 410 holds food item 408 and can be secured to food support platform 402 during cooking. For example, food pan 410 can be secured to food support platform 402 using magnets or thumb screws to prevent accidental movements of food item 408 when food support platform 402 moves along gantry 413. In some embodiments, food pan 410 includes special features and shapes to assist in automated cooking. For example, food pan 410 can include reference lines drawn over its internal surface to assist cameras and image identification modules to calculate food item 408's size. In addition, food pan 410 can include integrated sensors to measure the characteristics and conditions of food item 408 during cooking. For example, food pan 410 can include weight sensors, thermometers, moisture sensors, and so on, When food pan 410 is secured to food support platform 402, data interfaces on food pan 410 are connected to corresponding data interfaces on food support platform 402, which transfer collected sensor data from food pan 410 to the computing system of the smart cooking appliance. In some embodiments, food pan 410 has channels 411 on the bottom to remove liquid content created during cooking. As a result, the juice from food item 408 can be separated from food item 408 itself to improve texture and flavor. In some embodiments, food pan 410 includes an integrated suction device and a juice reservoir to separate the juice from food item 408.

Although only a pan-shaped device is illustrated in FIG. 4 for food pan 410, in practice, food pan 410 can take other shapes such as a rack, a barbeque spit, a stirrer, a rotisserie, and so on.

Figure 5:
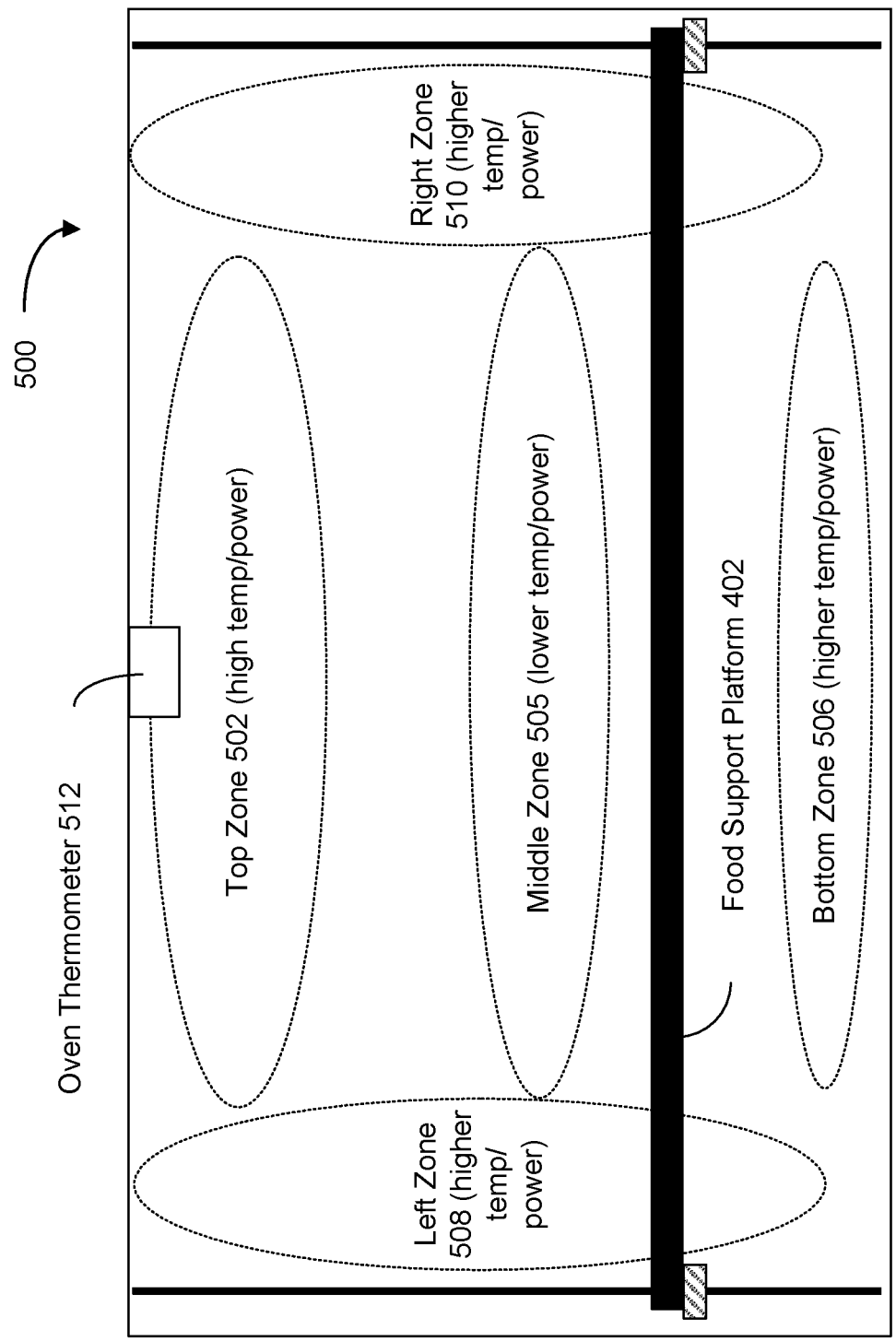
FIG. 5 illustrates temperature and heat power distribution inside a cooking chamber of a smart cooking appliance, in accordance with some embodiments.

FIG. 5 shows temperature and power distribution 500 inside a cooking chamber (e.g., cooking chamber 400 of FIG. 4) during cooking. Due to heating elements 405a-405d being located near the surface of cooking chamber 400 (see FIG. 4), temperature distribution inside cooking chamber 400 is not uniform with middle zone 505 having a lower temperature than zones near the surfaces (e.g., top zone 502, bottom zone 506, left zone 508, and right zone 510). Similarly, middle zone 505 receives less heat power due to being farther away from heating elements compared to other zones. Since oven thermometer 512 is located near the internal surface of the cooking chamber, the food item may be cooked at a lower temperature than desired. To address this issue, food support platform 402 and other components (e.g. heating elements) inside the cooking chamber are dynamically adjusted during cooking, as described in FIGS. 6A-6C.

Figure 6A:
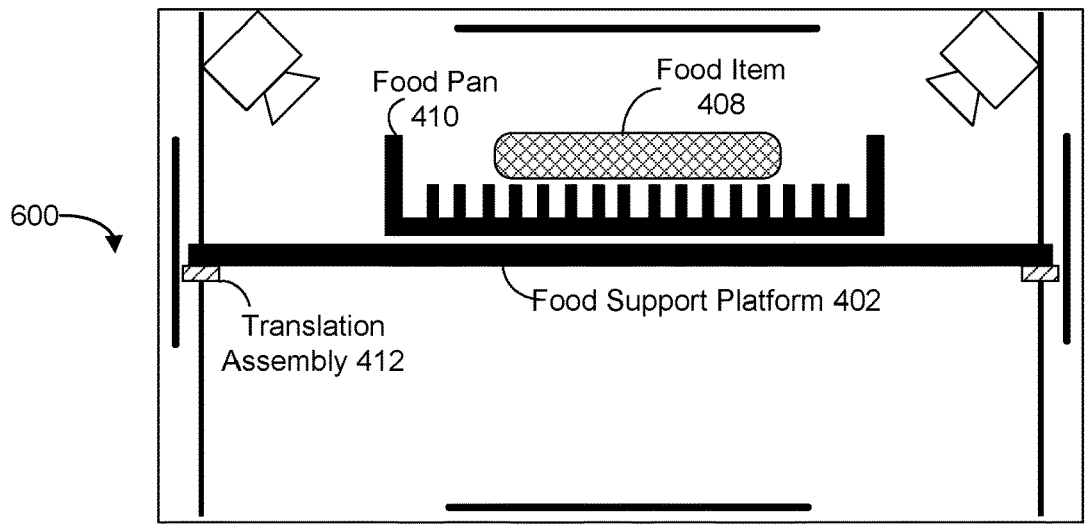
FIGS. 6A-6C illustrate coordination between food item cooking and oven heating during an exemplary cooking process in a smart cooking appliance, in accordance with some embodiments.)
Figure 6B:
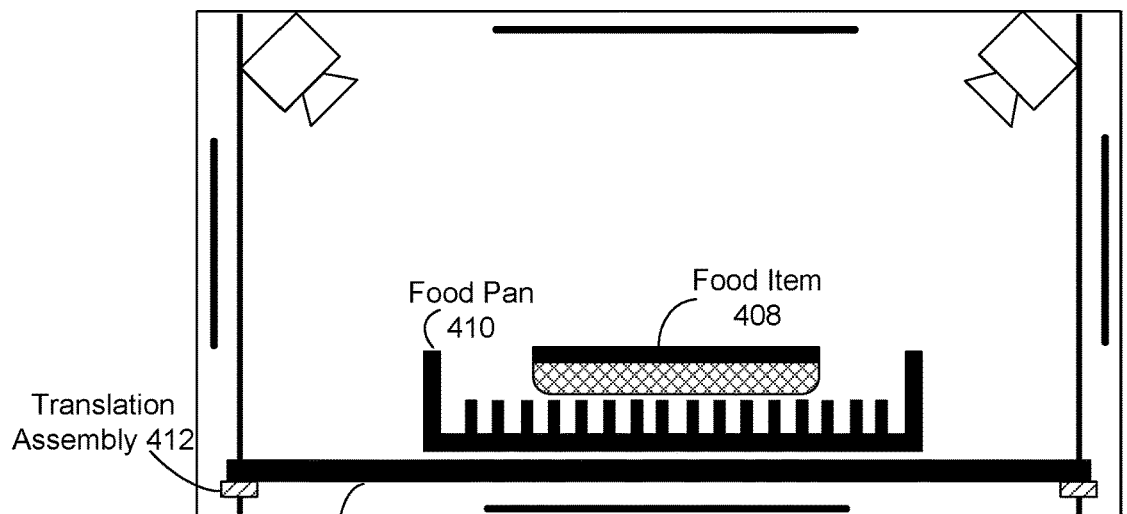
Figure 6C:
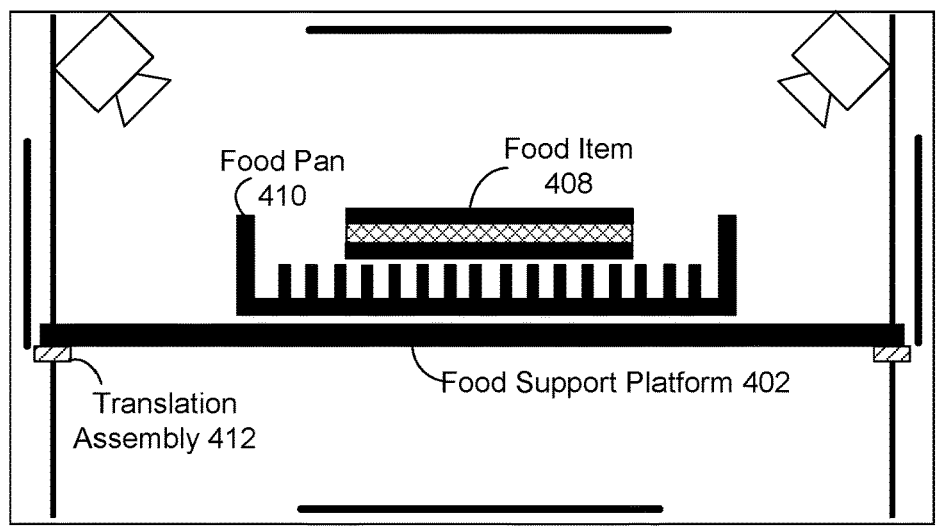

FIGS. 6A-6C illustrate coordination between food item cooking and oven heating during an exemplary cooking process 600 using the smart cooking appliance in accordance with some embodiments. In FIGS. 6A-6C, food support platform 402 moves to different locations inside cooking chamber 400 to allow controlled heating of different parts of food item 408.

In some embodiments, translation assembly 412 moves food support platform according to real-time inputs from a user. For example, the user can use directional buttons 320 displayed on user interface 300 to manually move food support platform 402.

In other embodiments, translation assembly 412 moves food support platform 402 according to generated machine instructions, such as those generated in response to food item parameter values and desired cooking result values received from user interface 300 in FIG. 3.

In some examples, the generated machine instructions are written in numerical control programming language that specifies time, coordinates, and heating element power output values.

In FIG. 6A, food support platform 402 is moved to a position near the top of cooking chamber 400. As a result, the top surface of food item 408 is exposed to higher heat power and temperature than the bottom surface, creating a seared layer on the top surface. In some embodiments, the machine instructions specify the exact location for food support platform 402 to move to and the length of time for food support platform 402 to stay at the location.

After the upper surface has been properly seared, food support platform 402 moves to a lower position as shown in FIG. 6B. There, being closer to the bottom heating element, food item 408 receives higher temperature and heat power to the bottom surface and forms a seared bottom layer.

Next, food support platform 402 moves to the middle position inside the cooking chamber as shown in FIG. 6C. There, food item 408 is being cooked at a lower temperature and heat power. For example, at this location, the internal portion of food item 408 is being thoroughly cooked to a desired doneness.

In some embodiments, translation assembly 412 is being controlled by the computing system to dynamically move food support platform 402 during cooking. For example, sensors in the cooking chamber (e.g., cameras of the cooking chamber and integrated sensors in food pan) continuously monitor food item 408 during cooking to provide a current condition of food item 408, and the computer system controls the movement of food support platform 402 and the power level of heating elements based on a difference between the desired cooking result and the current food item condition in a control loop feedback mechanism. For example, the computing system can use a proportional-integral-derivative controller (PID controller) to change the location of food support platform 402 and/or power level of heating elements to cause food item 408 to reach the desired temperature.

FIG. 7 is a flowchart diagram of a method 700 for performing a smart cooking process in a smart cooking appliance, in accordance with some embodiments.

The smart cooking process is performed at an oven (e.g., smart cooking appliance 200 of FIG. 2), where the oven includes a cooking chamber (e.g., cooking chamber 400 of FIG. 4), a movable food support platform (e.g., food support platform 402 of FIG. 4), and a control unit (e.g., computing system 130' of FIG. 1C). The control unit is configured to control one or more components of the oven such as the food support platform, a user input display, heating elements, sensors for capturing structured data such as temperature data, and sensors for capturing unstructured data such as images, and so on.

As the first step, the oven detects a first event that corresponds to a start of the cooking process for a food item (704). In some embodiments, the first event includes receiving multiple user inputs on the user input display of the oven. For example, the user inputs can specify food item parameter values (e.g., food item type, weight, size, and so on) and desired cooking results (e.g., doneness) on a touch-sensitive display on the oven. Refer to FIG. 3 and the related description for more detail on user inputs that initialize the cooking process. At the start of the cooking process, a first heating surface of the cooking chamber (e.g., heating element 405a of FIG. 4) is activated and operating at a first preset output level. The choice of which heating surface is to be activated is determined by cooking instructions generated by the oven's computing system in response to the first event.

In response to detecting the first event, a first heating surface of the cooking chamber is operating at a first preset output level, and one or more actuators are engaged to move the food support platform to a first position relative to the first heating surface (706). In some embodiments, the control unit of the oven generates cooking instructions that specify the power output level for heating elements and the position of the food support platform. For example, the cooking instructions are generated based on the user-entered food item parameter values and cooking results. The cooking instructions can include a time series of compound values, with each compound value includes a position value for the food support platform, a power output value for each of the heating surfaces, and a temperature value for the cooking chamber.

While the food support platform is at the first position relative to the first heating surface of the cooking chamber and the first heating surface is operating at the first preset output level, the control unit detects that oven reconfiguration criteria are met (708). For example, oven reconfiguration criteria can include a time threshold and/or a temperature threshold of the cooking chamber. In another example, oven reconfiguration criteria are part of a control loop feedback mechanism and include a condition of the food item during cooking (e.g., temperature of the food item, color of the food item, and so on) as monitored by the one or sensors inside the cooking chamber.

If the oven reconfiguration criteria are met, the oven next activates the one or more actuators to move the food support platform to a second position in the cooking chamber (710). For example, if the oven reconfiguration criteria involve a temperature of the food item, moving the food support platform can cause the food item to be placed in a different temperature region in the cooking chamber as specified by the generated cooking instructions. In some embodiments, the second position is further determined based on one or more cooking parameters during the cooking process. Exemplary cooking parameters include the food item type, cooking method, food item weight, food item size, and so on. For example, if the food item is a steak, the first position and the second position can be positions closer to two opposite heating surfaces to create a seared layer of the steak.

In some embodiments, the second position is determined dynamically by sampling temperature distribution inside the cooking chamber. For example, multiple thermometers can be integrated within the cooking chamber to provide temperature distribution inside the cooking chamber.

In some embodiments, the cooking chamber has multiple heating surfaces, and the food support platform operates in-between the heating surfaces.

In some embodiments, a second heating surface that is opposite to the first heating surface is operating at a second preset power output level at the start of the cooking process. The food support platform is closer to the first heating surface than the second heating surface at the first position, causing the food item surface closer to the first heating surface to receive greater heat power than the other surface. For example, the preset power output level is configured by the generated cooking instructions.

In some embodiments, the oven receives user input that specifies a third position for the food support platform and the control unit moves the food support platform accordingly. For example, the user can use directional keys on the oven's user input display (e.g., directional buttons 320 in FIG. 3) to control the movement of the food support platform to a third position. In some embodiments, a live view from the cooking chamber is displayed on a display of the oven (e.g., food item image 308) to help the user move the food support platform.

In some embodiments, the first and the second heating surfaces turns off in accordance with the generated instructions. For example, the first and the second heating surfaces may turn off after the food item has reached a desired temperature. In some embodiments, the food support platform moves in the cooking chamber in accordance with a current temperature distribution within the cooking chamber to place the food item in a desired region.

In some embodiments, the oven detects a second event that interrupts the cooking process. For example, the second event may include the user opening the cooking chamber to pause the cooking process. In response, the food support platform moves to a new position in accordance with the temperature distribution within the cooking chamber. For example, the food support platform can return to the middle of the cooking chamber for the user to inspect the food item.

Figure 8:
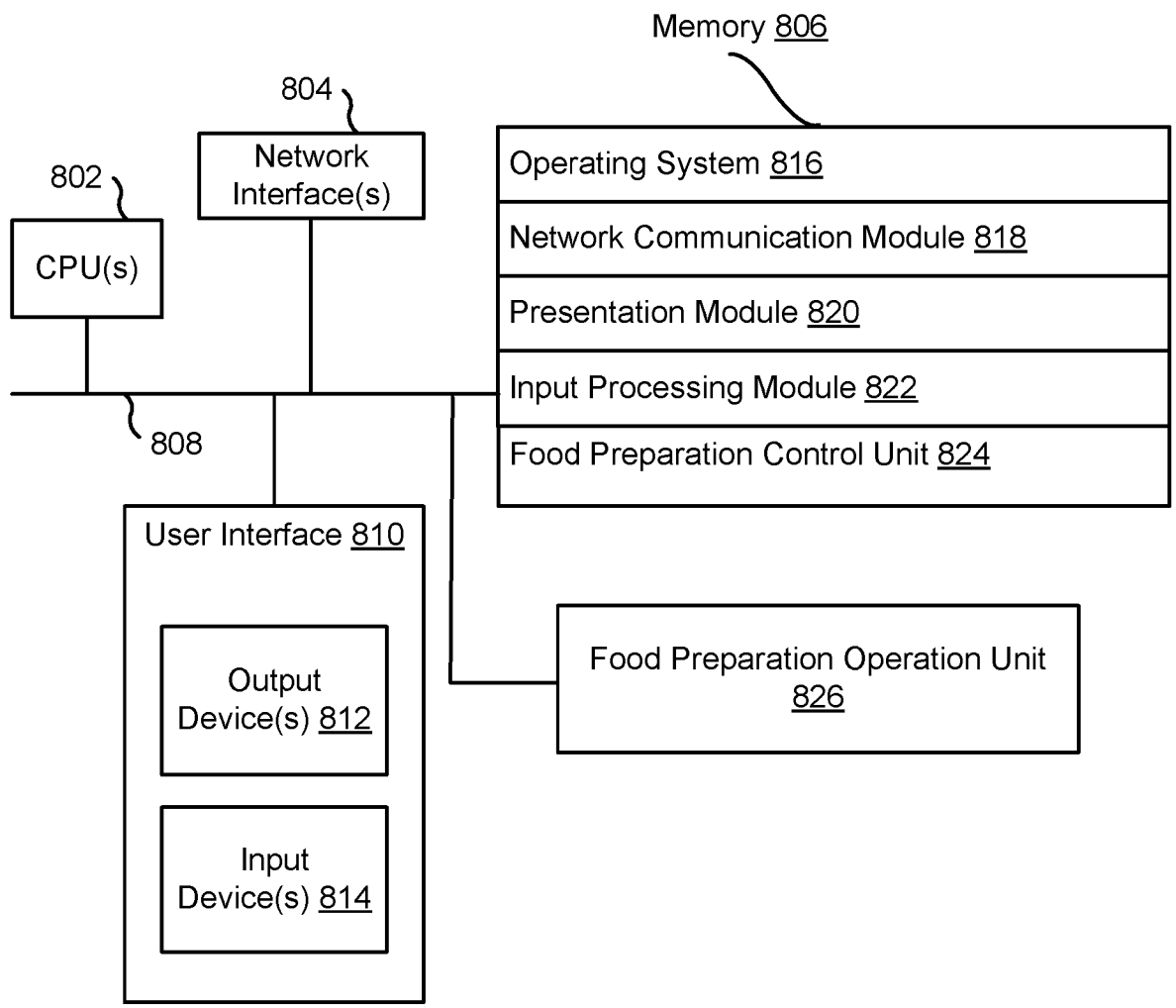
FIG. 8 is a diagram of an exemplary cooking appliance, in accordance with some embodiments.

FIG. 8 is a block diagram of an exemplary cooking appliance 800 in accordance with some embodiments. The cooking appliance 800 can serve as appliance 18, 112, 114, 140, 140', 200, 201, 202, 203, 204, for example, in various embodiments. The cooking appliance 800 includes one or more processing units (CPUs) 802, one or more network interfaces 804, memory 806, and one or more communication buses 808 for interconnecting these components (sometimes called a chipset). Cooking appliance 800 also includes a user interface 810. User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. In some embodiments, cooking appliance 800 further includes sensors (e.g., sensors 141, 142), which senses operating environment information of the cooking appliance 800. Sensors include but are not limited to one or more heat sensors, light sensors, one or more cameras, humidity sensors, one or more motion sensors, one or more biological sensors (e.g., a galvanic skin resistance sensor, a pulse oximeter, and the like), weight sensors, spectrometers, and other sensors. Furthermore, the cooking appliance 800 includes food preparation operation unit 826 (e.g., heating means that are based on electricity, induction, gas, radiation, etc.). Memory 806 includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

operating system 816 including procedures for handling various basic system services and for performing hardware dependent tasks;

network communication module 818 for connecting to external services via one or more network interfaces 804 (wired or wireless);

presentation module 820 for enabling presentation of information;

input processing module 822 for detecting one or more user inputs or interactions from one of the one or more input devices 814 and interpreting the detected input or interaction;

food preparation control unit 824, which controls the cooking appliance 800, including but not limited to modules of appliance 140 or 140' as forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

What is claimed is:
1. A method, comprising:
at an oven comprising a cooking chamber, a food support platform within the cooking chamber, and a control unit:

detecting a first event that corresponds to a start of a cooking process for a food item, wherein, at the start of the cooking process, a first heating surface of the cooking chamber is operating at a first preset output level;

in response to detecting the first event, activating one or more actuators to move the food support platform to a first position relative to the first heating surface of the cooking chamber;

collecting raw sensor data from the oven and sending the raw sensor data to a training set server, wherein the training set server is configured to process training data in accordance with training models and training methods employed by a training model server, wherein the training data comprises the raw sensor data received from the oven and annotated data from one or more user devices or an annotation station;

while the food support platform is at the first position relative to the first heating surface of the cooking chamber and while the first heating surface is operating at the first preset output level, detecting that oven reconfiguration criteria are met based in part on information provided by the training model server, wherein the oven reconfiguration criteria includes a first requirement that at least one of a time threshold and a temperature threshold is met in order for the oven reconfiguration criteria to be met; and in response to detecting that the oven reconfiguration criteria are met, activating the one or more actuators to move the food support platform relative to the first heating surface of the cooking chamber, from the first position to a second position that is distinct from the first position, wherein the oven further comprises a pan with channels, and a liquid that comes out of the food item during the cooking process is directed to a part of the cooking chamber that is cooler than a location of the food item in the pan, and the liquid is redirected back to the food item when the food item is moved out of a high-temperature zone of the cooking chamber.

2. The method of claim 1, wherein the cooking chamber has an upper heating surface and a lower heating surface, the first heating surface is one of the upper and lower heating surfaces, and the first and second positions are between the upper heating surface and the lower heating surface of the cooking chamber.

3. The method of claim 2, wherein at the start of the cooking process, the lower heating surface is operating at a second preset output level, and the first position is closer to the first heating surface than to the second surface and the second position is closer to the second heating surface than to the first heating surface.

4. The method of claim 1, including:
in response to detecting that the oven reconfiguration criteria are met:
determining a temperature distribution within the cooking chamber at a plurality of positions relative to the first heating surface; and
selecting the second position for the food support surface based on the temperature distribution within the cooking chamber.

5. The method of claim 4, wherein selecting the second position for the food support surface is further based on a cooking parameter of the cooking process, wherein the cooking parameter includes a food item type or a cooking method specified for the cooking process.

6. The method of claim 1, including:
receiving a user input that specifies a third position for the food support platform that is distinct from the second position; and
in response to receiving the user input that specifies the third position for the food support platform, activating the one or more actuators to move the food support platform relative to the first heating surface of the cooking chamber, from the second position to the third position.

7. The method of claim 1, including:
turning off the first heating surface; and
in accordance with a determination that the first heating surface is turned off, activating the one or more actuators to move the food support platform relative to the first heating surface of the cooking chamber in accordance with a current temperature distribution within the cooking chamber.

8. The method of claim 1, including:
detecting a second event that corresponds to an interruption of the cooking process; and
in response to detecting the second event that corresponds to an interruption of the cooking process, activating the one or more actuators to move the food support platform relative to the first heating surface of the cooking chamber in accordance with a current temperature distribution within the cooking chamber.

9. The method of claim 1, wherein the raw sensor data comprises an image, a weight, a temperature, or thermal map data.

10. The method of claim 1, wherein the raw sensor data is sent to the training set server, the method further comprising using a training model server to train an identification model, a localization models, or a doneness models based on the training data received from the training set server.

11. The method of claim 10, further comprising providing a cooking progress level determined by the training set server to the oven.

12. The method of claim 9, wherein the raw sensor data comprises an image of a food present in the cooking compartment of the oven captured by a camera, and wherein the image is captured after an image capture triggering system detects that there has been a change in the field of view of the camera.

* * * * *